No. 621,552. Patented Mar. 21, 1899.
J. W. BAKER.
FARM OR STOCK GATE.
(Application filed Nov. 19, 1898.)
(No Model.) 2 Sheets—Sheet 1.
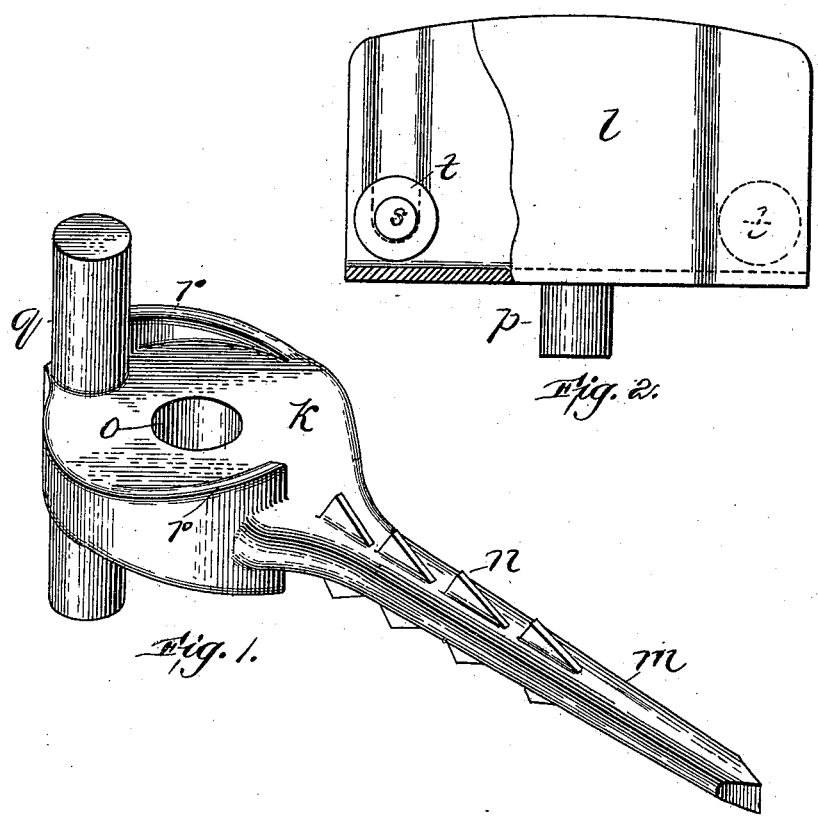
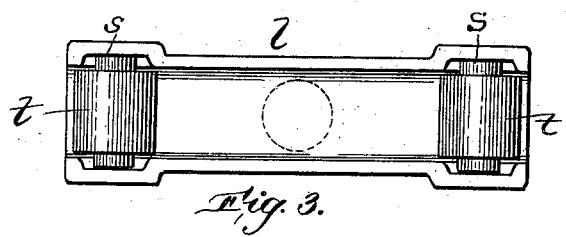
Witnesses: Inventor:

No. 621,552. Patented Mar. 21, 1899.
J. W. BAKER.
FARM OR STOCK GATE.
(Application filed Nov. 19, 1898.)
(No Model.) 2 Sheets—Sheet 2.
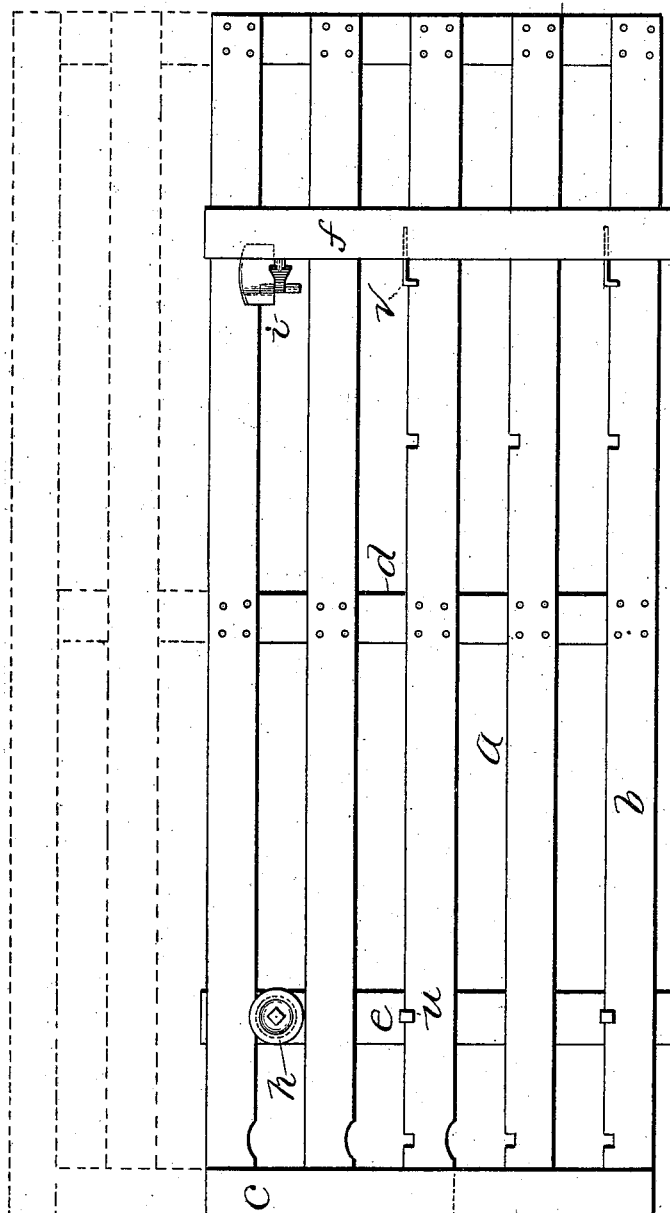
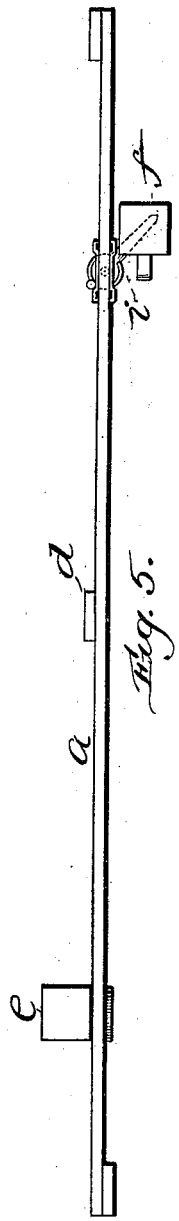
Witnesses: Inventor:
Jas. W. Baker,
By Crossley & Goddard,
Attys.

UNITED STATES PATENT OFFICE.

JAMES W. BAKER, OF BUZZARD'S BAY, MASSACHUSETTS.

FARM OR STOCK GATE.

SPECIFICATION forming part of Letters Patent No. 621,552, dated March 21, 1899.

Application filed November 19, 1898. Serial No. 696,849. (No model.)

*To all whom it may concern:*

Be it known that I, JAMES W. BAKER, of Buzzard's Bay, in the county of Barnstable and State of Massachusetts, have invented certain new and useful Improvements in Farm or Stock Gates, of which the following is a description sufficiently full, clear, and exact to enable those skilled in the art to which it appertains or with which it is most nearly connected to make and use the same.

This invention relates to that class of farm-gates which are so supported and hinged that they may be moved back longitudinally in order that a small gate, as for the accommodation of foot-passengers, may be opened, and then, if desired, be swung upon its hinges to open it to its fullest extent for the passage of teams and wagons.

Reference is to be had to the annexed drawings, and to the letters marked thereon, forming a part of this specification, the same letters designating the same parts or features, as the case may be, wherever they occur.

Of the drawings, Figure 1 is a perspective view of one member of the pivotal hinge comprising part of my invention. Fig. 2 is a front view of the other part of the hinge, a portion thereof being broken away to better exhibit the structural character of the member. Fig. 3 is a plan view of the member shown in Fig. 2. Fig. 4 is a front elevation of a gate constructed in accordance with my improvements, showing the gate as partially open and by dotted lines as in raised position. Fig. 5 is a plan view of the gate as represented in full lines in Fig. 4.

In the drawings, $a$ designates the gate proper, which is composed of longitudinal bars $b$, of suitable boards or like lumber, and vertical end pieces $c\ c$, to which the longitudinal bars $b$ are nailed or otherwise secured. Intermediate of the end pieces $c\ c$ cross pieces or slats $d$ may be nailed or otherwise secured to the longitudinal bars $b$, so as to construct a frame, as shown in Fig. 4.

$e, f,$ and $g$ designate posts secured in the ground at proper points, so as to support the gate and permit it to be operated, as hereinafter described. When the gate is closed, it will extend between the posts $g$ and $f$, as is indicated in Fig. 6, and when the gate is partially open it will be sustained by the posts $e$ and $f$ and when fully open it will be sustained by the post $f$ alone.

The principal parts comprising my improvement are the roller $h$ and the swinging hinge $i$. The roller $h$ turns on a stud adapted to be driven in or secured to the post $e$, so that the gate may bear upon a suitable part of the roller $h$ in such manner that the said roller may turn upon the said stud, which secures it to the post, as stated.

The swinging hinge is composed of two members $k$ and $l$. The member $k$, which may be termed the "pintle" member, has a spike $m$ connected with it, which spike is adapted to be driven into the post $f$, so as to extend diagonally therefrom, as is, perhaps, most clearly represented in Fig. 5. By this means the swinging hinge is attached to the post. The spike $m$ may be provided with spurs $n$ to maintain it in place after being driven into the post.

The outer projecting and efficient part of the member $k$ is provided centrally with a hole $o$, into which the pintle $p$ of the member $l$ may project. The efficient part of the member $k$ is furthermore provided with pins $q$, projecting from opposite sides and from the outer margin of said member for a purpose to be presently explained. In addition to the features before mentioned the efficient part of the member $k$ is provided on its opposite sides and at the opposite edges of its opposite sides with inclined ledges $r$, upon which the base of the member $l$ rests when the gate is in open position. One of the ledges on each side of the member $k$ inclines from the inner side toward the pin $q$ and the other from the pin $q$ toward the inner side.

The member $l$ consists of a base piece or part integrally connected with the pin $p$, and from said base there project upwardly on opposite sides of the base two side pieces, which at their ends are grooved to receive the journals $s$ of rollers $t$, each member $l$ being equipped with two rollers, located at opposite ends of the said member.

The gate before described will, after the posts are secured in the ground and the roller $h$ and hinge $i$ are secured to the posts $e$ and $f$, respectively, be hung upon the swinging hinge and roller by placing the lower edge of a bar of the gate between the two side pieces of the member *l* upon the roller *t* and upon the roller *h*, connected with the post *e*.

The swinging hinge will in practice be placed at a little higher point than the roller *h*, so that the gate when hung upon the hinge and roller and properly supported by hand will have its free end tend to gravitate toward the post *g* and so assist in closing the gate. Furthermore, guiding and holding clips *u v* may be connected with the posts, so as to engage some of the longitudinal bars of the gate and hold the same against lateral displacement by pressing thereagainst; and, again, the bars *b* of the gate will be cut away at proper points, so that the said bars *b* may be released from the roller *h* and holding-clips *u v* in order that the gate may be swung around without the roller or holding-clips interfering therewith or obstructing its free swing. When now the gate is hung, as before described, and is released so as to have freedom of motion, and supposing it in the partially-open position shown in Fig. 4, its own gravity will have a tendency to cause it to move from the posts *e* and *f* toward the post *g* and so assist in closing it. When, however, it is desired to partially open the gate, this may be accomplished by simply moving it back to the full-line position shown in Fig. 4, and when it is desired to fully open the gate it will be moved still farther back, so that the roller *h* and holding-clips *u v* may be freed from the longitudinal bars and the gate be swung around on its pivotal hinge at substantially a right-angular position from that in which it is shown in Fig. 4. When in this position, it will be held nearly or quite balanced and sustained in horizontal position upon the rollers *t t* of the member *l*.

In opening the gate from its closed to its fully-open position the base of the member *l* will ride up on the inclines *r r*, so that when the gate is released it will first by its own gravity run down on the inclines *r r*, bringing the gate to a position parallel or substantially parallel with the posts *e f g*, with a little aid by hand, closing in upon the roller *h* and clips *u v*, and then by reason of its gravity, due to its slightly-inclined position, it will run on the rollers *t* and *h* back to closed position without exterior aid.

I lay great stress upon the particular construction shown of the inclined ledges *r r* of the efficient portion of the member *k*, as well as the double rollers in the part *l*, since unless there were two rollers to support the gate in substantially horizontal position when it it is fully open the forward or free end or else the backward end would drop down and the gate could not have a tendency to close automatically, as described.

The ledges *r r* on the efficient portion of the member *k* effect the automatic "swinging to" of the gate, and the double rollers *t* in the member *l*, coöperating with the roller *h*, assist the gate in being run to fully-closed position in a horizontal direction after swinging to.

The pins *q q* on the member *k* act as stops to prevent the gate from being opened beyond a substantially right-angular position relatively to its fully-closed position.

It is to be noted that the member *k* is reversible in order that it may be put in posts on one side of the gate or the other—that is, to make the gate what is commonly known as either "right" or "left" hand.

It is repeated that the structural characteristics of the combined hinge and double rollers comprising the members *k* and *l* of the swinging hinge considered in connection with the roller *h* are the essential features of my improvement, since thereby I am enabled to open and close the gate readily and easily, as described. It will be seen that the gate may be readily lifted off its hinge or be raised from the full-line position represented in Fig. 4 to the dotted-line position in said figure to allow small stock, such as sheep and hogs, to be driven through the gate without opening it, so that larger stock, such as horses and cattle, could pass through.

Having thus explained the nature of the invention and described a way of constructing and using the same, though without attempting to set forth all of the forms in which it may be made or all of the modes of its use, it is declared that what is claimed is—

1. A combined hinge and rollers for farm-gates consisting of a member *l* provided with rollers at each end, and a centrally-located downwardly-extended pintle, and a member *k* having the spike *m*, and provided with a hole *o* for the reception of the pintle and on each side with oppositely-located inclined peripheral ledges, and with stop-pins *q* projecting from opposite sides and from the outer margin, substantially as set forth.

2. The combination, with a sliding gate, of a combined hinge and rollers consisting of a member *l* provided with rollers at each end forming a vertical bearing for a bar of the gate, and a centrally-located downwardly-extended pintle and a member *k* having the spike *m* and provided with a hole *o* for the reception of the pintle and on each side with oppositely-located inclined peripheral ledges, and with stop-pins *q* projecting from opposite sides and from the outer margin, substantially as set forth.

In testimony whereof I have signed my name to this specification, in the presence of two subscribing witnesses, this 19th day of September, A. D. 1898.

JAMES W. BAKER.

Witnesses:
ARTHUR W. CROSSLEY,
ANNIE J. DAILEY.